(12) United States Patent
Kim

(10) Patent No.: US 11,326,955 B2
(45) Date of Patent: May 10, 2022

(54) INTELLIGENT FLAME THERMOGRAM DETECTION APPARATUS AND METHOD USING INFRARED

(71) Applicant: Hansun ST(Security Technology) Inc., Daejeon (KR)

(72) Inventor: Suun Kim, Daejeon (KR)

(73) Assignee: HANSUN ST(SECURITY TECHNOLOGY) INC., Daejon (KR)

( * ) Notice: Subject to any disclaimer, the term of this patent is extended or adjusted under 35 U.S.C. 154(b) by 891 days.

(21) Appl. No.: 16/090,688

(22) PCT Filed: Sep. 18, 2017

(86) PCT No.: PCT/KR2017/010195
§ 371 (c)(1),
(2) Date: Oct. 2, 2018

(87) PCT Pub. No.: WO2018/190478
PCT Pub. Date: Oct. 18, 2018

(65) Prior Publication Data
US 2021/0208001 A1    Jul. 8, 2021

(30) Foreign Application Priority Data

Apr. 11, 2017    (KR) .................. 10-2017-0046652

(51) Int. Cl.
*G01J 5/00*     (2022.01)
*G06T 7/62*     (2017.01)
(Continued)

(52) U.S. Cl.
CPC .......... *G01J 5/0018* (2013.01); *G01J 5/0025* (2013.01); *G01J 5/025* (2013.01); *G06T 7/62* (2017.01); *G08B 17/125* (2013.01); *G01J 5/48* (2013.01); *G01J 5/485* (2022.01); *G06T 2207/10048* (2013.01)

(58) Field of Classification Search
None
See application file for complete search history.

(56) References Cited

U.S. PATENT DOCUMENTS

2006/0209184 A1* 9/2006 Chen .................... G08B 29/186
                                                          348/61
2008/0036593 A1* 2/2008 Rose-Pehrsson ...... G08B 25/00
                                                          340/540

(Continued)

FOREIGN PATENT DOCUMENTS

KR    10-2009-0123317 A    12/2009
KR    10-2013-0119752 A    11/2013
(Continued)

*Primary Examiner* — Leon Viet Q Nguyen
(74) *Attorney, Agent, or Firm* — Locke Lord LLP; Scott D. Wofsy; Michael J. Pollack

(57) ABSTRACT

The present invention relates to an intelligent flame detection apparatus and method using an infrared thermogram, which combine a conventional flame detector with an infrared thermographic camera and an infrared thermogram processing technology, and which enable whether a flame signal received from a flame sensor is an allowed flame or an artificial flame to be accurately detected, thereby improving the accuracy of fire alarms.

9 Claims, 12 Drawing Sheets

(51) Int. Cl.
  *G01J 5/02*    (2022.01)
  *G08B 17/12*   (2006.01)
  *G01J 5/48*    (2022.01)

(56) References Cited

U.S. PATENT DOCUMENTS

2011/0085030 A1* 4/2011 Poe .......................... F23N 5/08
                                                   348/61
2011/0297828 A1* 12/2011 Weisbach ........... H04N 5/35581
                                                   250/330
2018/0114430 A1* 4/2018 Westmacott ........... G08B 25/14

FOREIGN PATENT DOCUMENTS

| KR | 10-2014-0097055 A | 8/2014 |
| KR | 10-2015-0078049 A | 7/2015 |
| KR | 10-2016-0061614 A | 6/2016 |

* cited by examiner

INTELLIGENT FLAME THERMOGRAM DETECTION APPARATUS AND METHOD USING INFRARED

TECHNICAL FIELD

The present invention relates generally to an intelligent flame detection apparatus and method using an infrared thermogram, and more specifically to an intelligent flame detection apparatus and method using an infrared thermogram, which combine a conventional flame detector with an infrared thermographic camera and an infrared thermogram processing technology, and which enable whether a flame signal received from a flame sensor is an allowed flame or an artificial flame to be accurately detected, thereby improving the accuracy of fire alarms.

BACKGROUND ART

In general, when a fire alarm is sounded, evacuation is performed, the location of a fire is determined, and fire extinguishing work is performed. However, if the fire alarm is an unwanted alarm (an erroneous fire alarm attributable to an abnormal factor, other than heat, smoke or flame attributable to a fire), economic loss as well as great discomfort may occur.

In particular, when an unwanted alarm is issued in an automated factory or the like, the operation of a production line will be stopped, and thus great loss may occur. In contrast, when a fire alarm is not sounded even in case of a fire, greater loss may be incurred.

Accordingly, a flame detector capable of detecting a small flame unlike a general fire detector (for detecting smoke, heat, or the like) is used. This flame detector provides advantages in that a fire can be detected in an early stage and the fire detector is advantageous for an early response to a fire. Accordingly, the flame detector is widely used in important industrial facilities.

In most cases, when a fire occurs, a flame exhibits unique combustion characteristics. One of the combustion characteristics is the emission of specific electromagnetic waves. Detecting specific electromagnetic waves is the principle of the flame detector.

In other words, a flame emits ultraviolet rays (ranging from 185 to 260 nm) in a specific wavelength band and infrared rays (ranging from 4.3 to 4.4 µm) based on $CO_2$ resonance radiation. Detecting ultraviolet and infrared rays and sounding a fire alarm are the principle of the flame detector.

Meanwhile, ultraviolet/infrared ray detectors, a three-wave infrared ray detector, etc. are used as such flame detectors (sensors). These detectors are formed by combining sensors in accordance with use environments in order to increase the accuracy of fire detection and, thus, can reduce unwanted alarms and perform more elaborate fire detection.

These flame detectors use a method for reducing unwanted alarms through the setting of sensitivity based on the size of a flame and temporal setting. For example, the determination of whether to operate each of the detectors is set using the size and duration of a flame in various unwanted alarm conditions, such as the conditions of a gas lighter flame, a gas burner flame, an illumination light, etc.

The accompanying FIG. 1 shows a three-wave flame detector (called an IR3 method detector) using a $CO_2$ resonance radiation characteristic, widely used currently as a flame detector, as an example of conventional technology.

As shown in FIG. 1, the three-wave flame detector is configured to include: three optical infrared ray filters $220_1$, $220_2$ and $220_3$ configured to selectively transmit infrared rays in three wavelength bands (4.0 µm, 4.4 µm, and 5.0 µm), i.e., $CO_2$ resonance radiation bands; three infrared ray sensors $240_1$, $240_2$ and $240_3$ configured to receive the infrared rays transmitted through the optical filters; three signal amplification units $250_1$, $250_2$ and $250_3$ configured to have filters adapted to transmit only flicker frequency components in the range from 1 to 10 Hz selected from the outputs of the infrared sensors $240_1$, $240_2$ and $240_3$ and to selectively amplify only the frequency components; and a fire determination and control unit 260 configured to calculate the sizes of signal values output from the respective signal amplification units $250_1$, $250_2$ and $250_3$ and the ratio between the signal values by using a separate algorithm, to determine that a fire has occurred only when the spectrum peak pattern of $CO_2$ resonance radiation radiated from a flame has been detected, and to transmit a fire signal to a signal output unit 270.

Although this infrared ray three-wave flame detector is advantageous in that the performance of the selection of a flame is significantly high, the infrared ray three-wave flame detector does not react to artificial light, such as natural light, fluorescent lamp light, sodium lamp light, mercury lamp light, etc., the infrared ray three-wave flame detector is disadvantageous in that the infrared ray three-wave flame detector may erroneously detect, for example, high-temperature temperature equipment present at an industrial site, each of various surrounding electric heaters, a heat generation light, a heater, or the like as a flame.

Furthermore, although recently a fire detection method using a thermogram camera has been used, the fire detection method has difficulty accurately detecting whether a flame is present by means of only a temperature in that high-temperature temperature equipment present at an industrial site, each of various surrounding electric heaters, a light, a heater, or the like is detected as a flame, and so force in the same manner. Accordingly, the fire detection method is limited in use as an actual flame detector.

As described above, the conventional flame detectors are products which are formed by using an infrared sensor and an ultraviolet ray sensor along or in combination. The conventional flame detectors chiefly include two types of detectors, i.e., ultraviolet/infrared (UV/IR) ray detectors and three-wave flame detectors (IR3).

The accompanying FIG. 2 shows the appearance of a three-wave flame detector configured to detect only a flame by reading the waveform of a flame characteristic by using three infrared sensors and a 4.4 µm near band filter. The accompanying FIG. 3 shows the appearance of an ultraviolet ray/infrared ray detector configured to detect only a flame by using an infrared ray sensor and an ultraviolet ray sensor together.

However, although the conventional flame detectors can desirably detect a flame, they have great difficulty determining whether the flame results from an artificial fire or a fire attributable to arson, and are thus disadvantageous in that each of various environment factors (a gas burner, an electric heater, an industrial welding flame, and light (halogen light, solar light, etc.)) at sites, etc. is erroneously detected as a fire flame and then an unwanted alarm is issued.

PRIOR ART DOCUMENTS

Patent Documents (Patent document 1) Korean Patent No. 10-0882236 (issued on Jan. 30, 2009)
(Patent document 2) Korean Patent No. 10-1372989 (issued on Mar. 5, 2014)

DISCLOSURE

Technical Problem

The present invention has been conceived to overcome the above-described problems of the prior art, and an object of the present invention is to provide an intelligent flame detection apparatus and method using an infrared thermogram, which combine a conventional flame detector with an infrared thermographic camera module and an infrared thermogram processing technology, and which enable the type and risk of a flame in an intelligent manner to be accurately determined through the cooperative relationships between the above components, thereby significantly reducing unwanted alarms and considerably improving the accuracy of fire alarms.

Technical Solution

In order to accomplish the above object, an implementation of the present invention provides an intelligent flame detection apparatus using an infrared thermogram, the apparatus including: a housing; a flame sensor mounted on the housing, and configured to detect a flame within a monitoring area; an infrared thermographic camera mounted on the housing, and configured to acquire a thermogram of the monitoring area; and a control board configured to perform image processing adapted to determine whether the flame within the monitoring area is a flame attributable to a real fire or an artificial flame allowed in advance through image processing of the thermogram photographed by the infrared thermographic camera and processing of sensing data acquired by the flame sensor.

Preferably, a flame detector using ultraviolet or infrared rays or a three-wave flame detector may be adapted as the flame sensor.

Particularly, the control board may include: a flame detection signal reception unit configured to receive a flame detection signal of the flame sensor; an image processing unit configured to perform image processing adapted to determine whether the flame within the monitoring area is a flame attributable to a real fire or an artificial flame allowed in advance based on the thermogram of the flame photographed by the infrared thermographic camera; a fire determination unit configured to determine whether a fire signal has been generated by comparing a size of the flame with a reference value; an alarm signal output unit configured to output a fire alarm signal in response to a fire occurrence signal output from the fire determination; and a communication module configured to perform communication with a smart device possessed by a user.

Preferably, the control board may perform control such that the infrared thermographic camera pertains photographing adapted to determine whether a human is present within the monitoring area when, as a result of the image processing, the flame is not an allowed flame, the value of infrared rays radiated from the flame is larger than an allowable infrared ray value, or the value of ultraviolet rays radiated from the flame is larger than an allowable ultraviolet ray value.

Furthermore, when the user inputs an artificial flame by using a possessed smart device, the artificial flame input by the user is registered in the control board as a flame allowed in advance via the communication module.

In order to accomplish the above object, another implementation of the present invention provides an intelligent flame detection method using an infrared thermogram, the method including: i) detecting, by a flame sensor, a flame present in a corresponding monitoring area; ii) acquiring, by an infrared thermographic camera, a thermogram of the monitoring area; iii) performing, by an image processing unit of a control board, image processing adapted to determine whether the flame within the monitoring area is a flame attributable to a real fire or an artificial flame allowed in advance based on the acquired thermogram; iv) determining, by a fire determination unit, whether a fire signal has been generated by comparing a size of the flame based on the image processing with a reference value; and v) outputting, by an alarm signal output unit, a fire alarm signal in response to a fire occurrence signal output from the fire determination unit.

Preferably, the intelligent flame detection method further includes, before performing the image processing, registering the artificial flame, input by the user, in the control board as a flame allowed in advance via a communication module by inputting the artificial flame by using the smart device possessed by the user.

Particularly, performing the image processing at step iii) may include: determining whether a flame is present within the monitoring area; when the flame is present within the monitoring area, determining coordinates and size of the flame, and then determining whether the determined flame is a flame attributable to a real fire or an artificial flame allowed in advance; and when the determined flame is an allowed flame, outputting a non-fire signal.

Preferably, an infrared or ultraviolet ray value input from the current flame sensor may be converted into a background value along with outputting the non-fire signal, and then the image processing may be re-performed again when the infrared or ultraviolet ray value input from the flame sensor is equal to or larger than the resulting background value.

Furthermore, when, as a result of the image processing, it is determined that the flame is not an allowed flame, a currently infrared ray value is larger than an allowable infrared ray value, or a current ultraviolet ray value is larger than an allowable infrared ray value, determining whether a human is present within the monitoring area by using the infrared thermographic camera is performed.

Furthermore, when it is determined that a human is present within the monitoring area, determining, by the image processing unit, the coordinates of the human, determining, by the image processing unit, the adjacency between the human and the flame, and continuously monitoring, by the image processing unit, a variation in the size of the flame may be performed, and a fire determination unit may output a fire signal for a fire alarm when the size of the flame is larger than a reference value.

Regardless of whether a human is present within the monitoring area, when, as a result of the image processing, it is determined that the size of the flame is larger than a reference value by comparing the size of the flame within the monitoring area with a reference value, a fire determination unit may output a fire signal for a fire alarm.

Advantageous Effects

The present invention provides the following effects via the above-described technical solutions.

First, when the type of a flame is determined, an artificially used flame can be detected as a flame unrelated to a fire alarm situation, and thus it can be accurately detected whether a currently detected flame is a flame related to the occurrence of a fire or an artificial flame, thereby improving the accuracy of fire alarms.

In other words, the ordinary flames of an electric light, a gas burner, a heater, an electric heater, etc. present in various flame monitoring spaces (for example, an office, an industrial site, etc.) can be processed as exceptions through the previous setting of a user via a smart device, thereby significantly reducing unwanted alarms.

Second, a welding flame, a torch flame, etc., i.e., flames used by an operator, are detected as work flames at the same time that a human is detected, thereby significantly reducing unwanted alarms.

Third, when the type of a flame is determined, the region of an allowed flame can be determined, and thus a predetermined region at a special site using a fire can be processed as an exceptional region, thereby eliminating unwanted alarms and more improving the accuracy of fire alarms.

Fourth, an erroneous fire alarm rate, which is a disadvantage of the conventional flame detector, can be significantly reduced, and thus economic loss can be considerably reduced (for example, massive economic loss attributable to the stopping of the operation of a factory line in case of a fire can be reduced).

MODE FOR INVENTION

Preferred embodiments of the present invention will be described in detail below with reference to the accompanying drawings.

Figure 1:
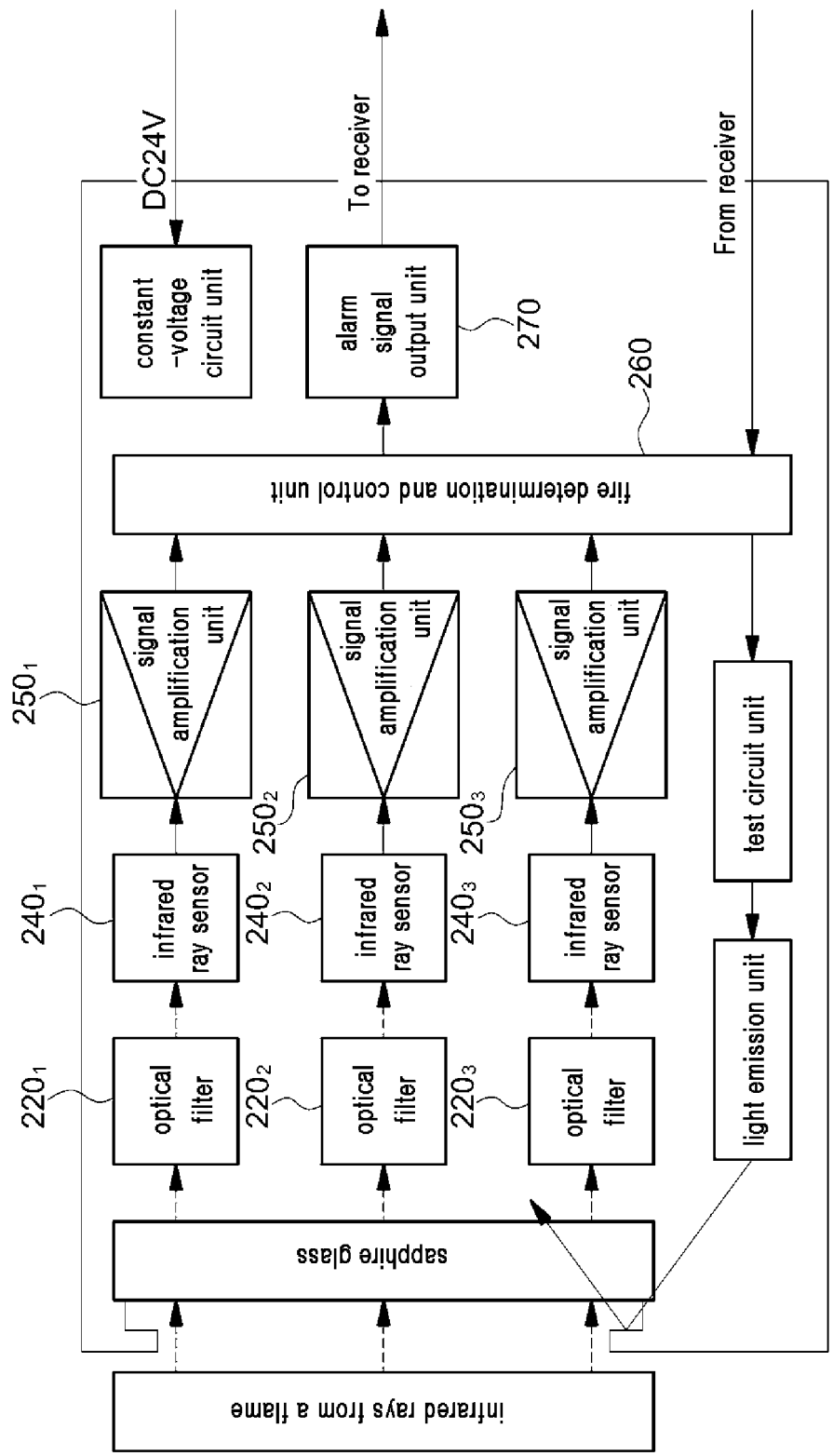
FIG. 1 is a diagram showing the configuration of a three-wave flame detector as an example of a conventional technology.
Figure 2:
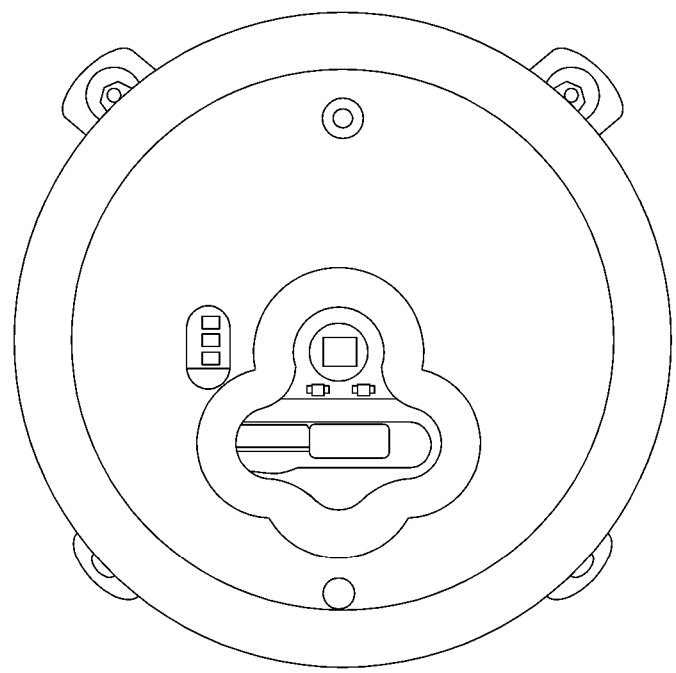
FIG. 2 is an image showing the appearance of the conventional three-wave flame detector.
Figure 3:
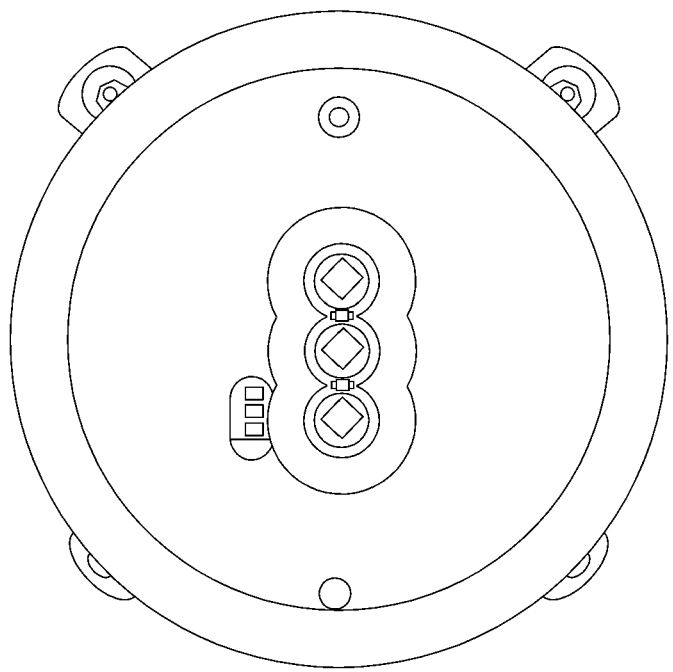
FIG. 3 is an image showing the appearance of a conventional ultraviolet/infrared ray detector.
Figure 4:
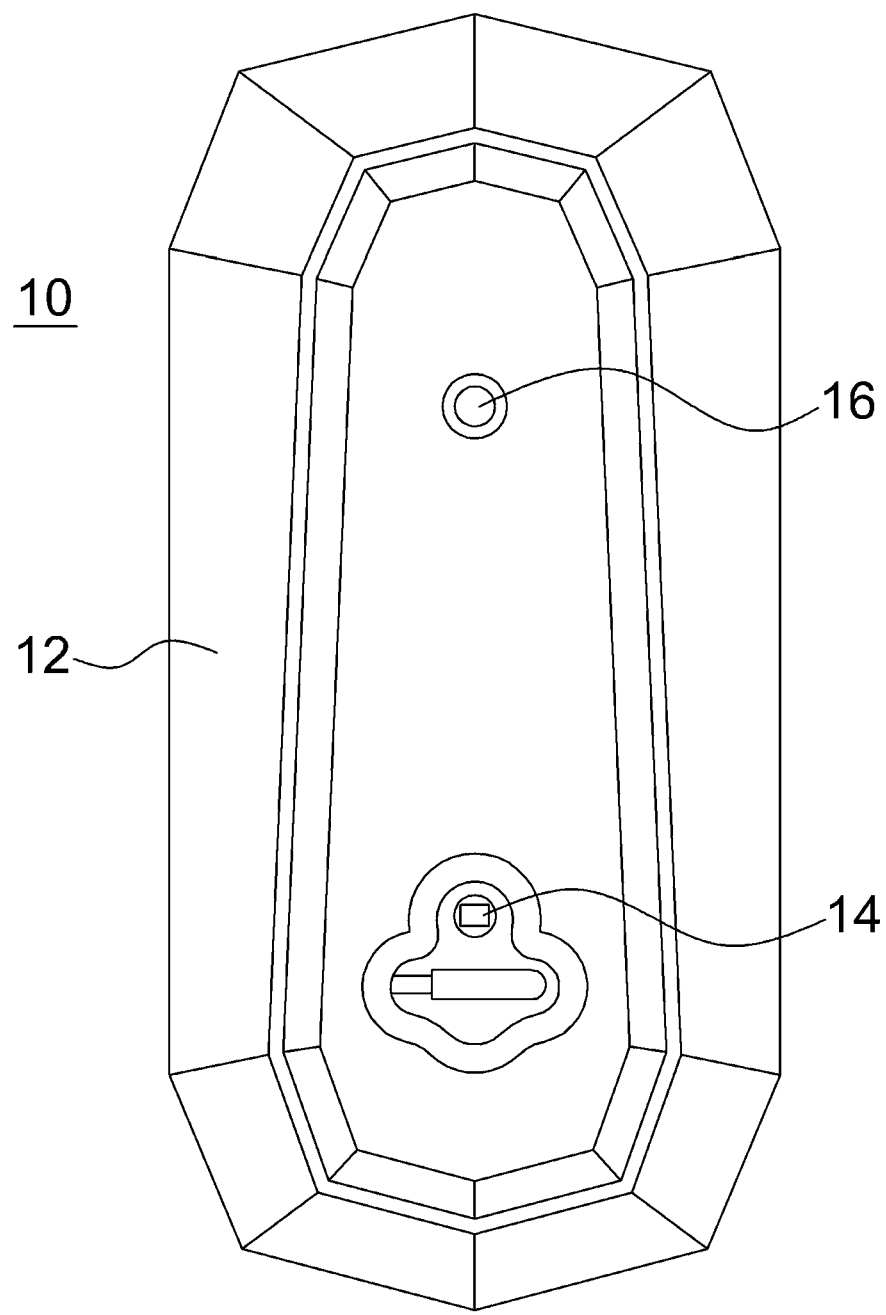
FIG. 4 is a view showing an intelligent flame detection apparatus using an infrared thermogram according to an embodiment of the present invention.

The accompanying FIG. 4 shows an embodiment of an intelligent flame detection apparatus using an infrared thermogram according to the present invention.

As shown in FIG. 4, an intelligent flame detection apparatus 10 according to an embodiment of the present invention is provided in a structure in which a flame sensor 14 and an infrared thermographic camera 16 are mounted on a housing 12 to be located in the same line. The flame sensor 14 and the infrared thermographic camera 16 detect a flame at the same monitoring angle.

In an embodiment of the present invention, an ultraviolet or infrared (UV/IR) detector, i.e., a flame sensor using an ultraviolet or infrared ray, is adopted as the flame sensor 14.

Figure 5:
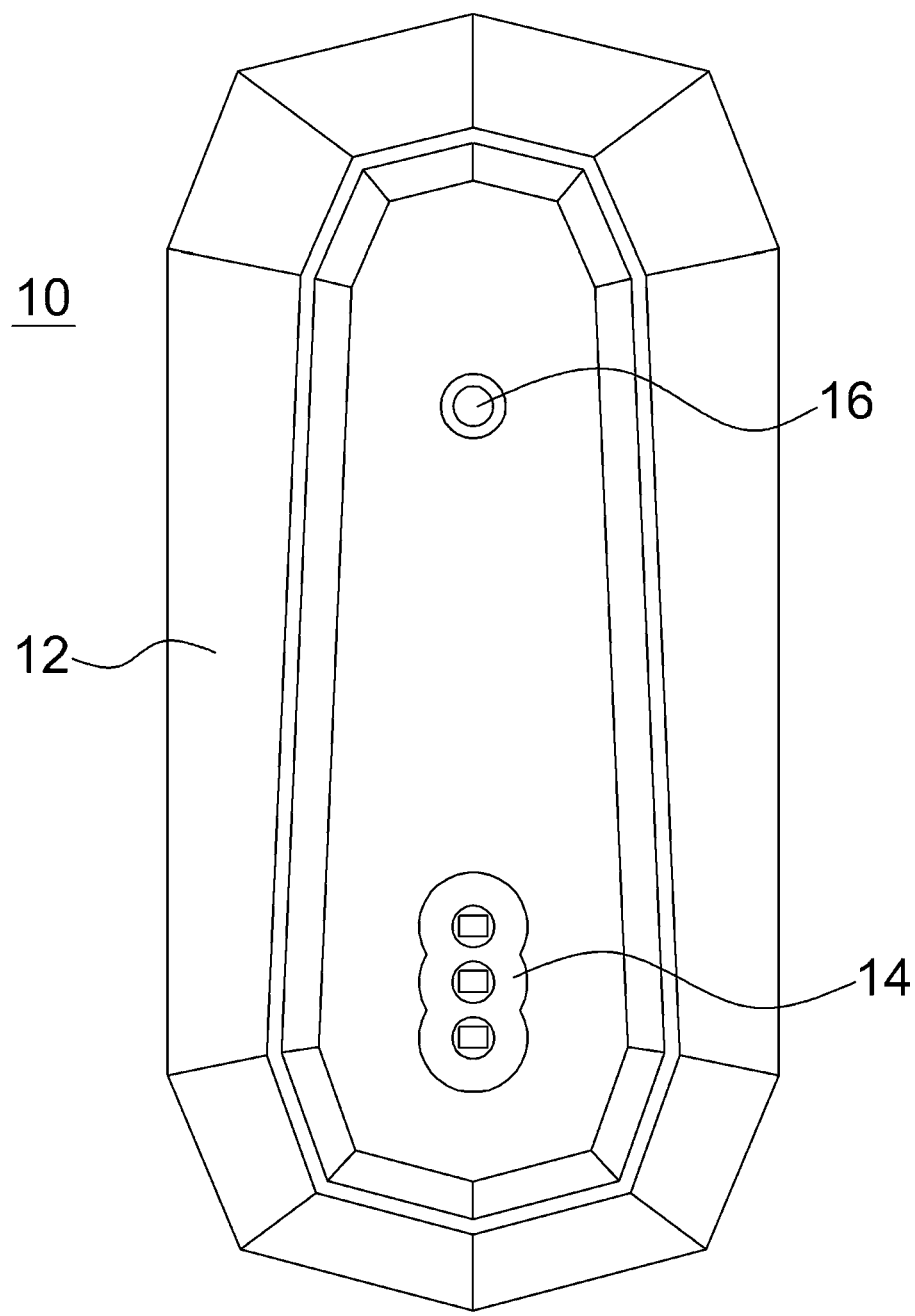
FIG. 5 is a view showing an intelligent flame detection apparatus using an infrared thermogram according to another embodiment of the present invention.

The accompanying FIG. 5 shows another embodiment of an intelligent flame detection apparatus using an infrared thermogram according to the present invention.

As shown in FIG. 5, an intelligent flame detection apparatus 10 according to another embodiment of the present invention is also provided in a structure in which a flame sensor 14 and an infrared thermographic camera 16 are mounted on a housing 12 to be located in the same line. The flame sensor 14 and the infrared thermographic camera 16 detect a flame at the same monitoring angle.

In another embodiment of the present invention, a three-wave flame detector (IR3) is adopted as the flame sensor 14. Alternatively, various types of infrared sensors may be mounted and used.

Meanwhile, the intelligent flame detection apparatus according to each of the above-described embodiments of the present invention includes a control board 20 which is mounted inside the housing 12.

In particular, the control board 20 is equipped with a processor, memory, etc. used to perform the image processing of a thermogram photographed by an infrared thermographic camera and to perform the processing of the sensing data of the flame sensor, and performs image processing adapted to determine whether a flame within a monitoring area is a flame attributable to a real fire or an artificial flame allowed in advance.

Figure 6:
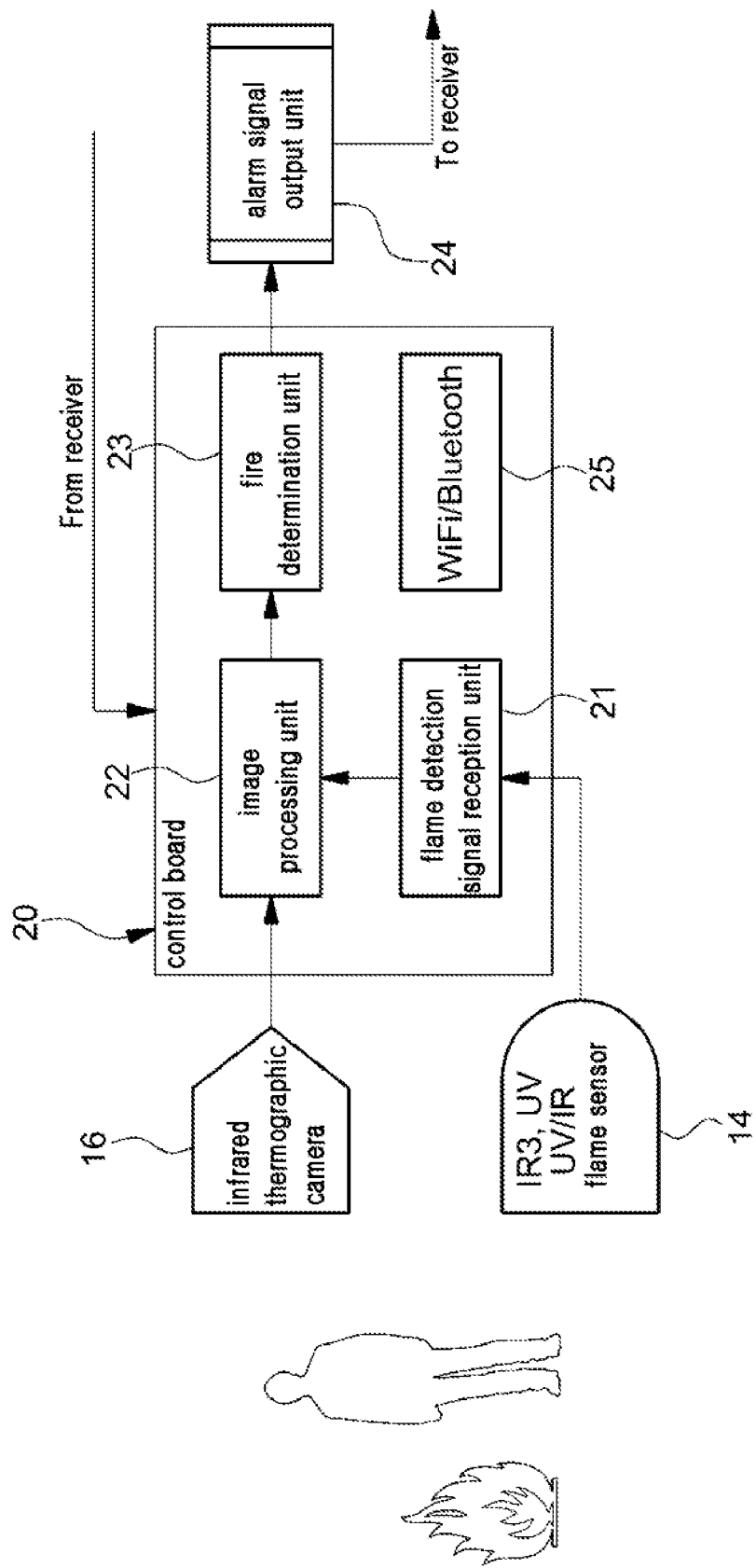
FIG. 6 is a control configuration diagram of the intelligent flame detection apparatus using an infrared thermogram according to the present invention.

For this purpose, as shown in the accompanying FIG. 6, the control board 20 is configured to include: a flame detection signal reception unit 21 configured to receive a flame detection signal of the flame sensor 14; an image processing unit 22 configured to perform image processing adapted to determine whether a flame within a monitoring area is a flame attributable to a real fire or an artificial flame allowed in advance based on a thermogram of the flame photographed by the infrared thermographic camera 16; a fire determination unit 23 configured to determine whether a fire signal has been generated by comparing the size (region) or the like of the flame, based on the result of the image processing, with a reference value; and an alarm signal output unit 24 configured to output a fire alarm signal in response to a fire occurrence signal output from the fire determination unit 23.

Furthermore, the control board 20 is equipped with a communication module 25, such as a WiFi or Bluetooth module or the like, in order to communicate with a smart device (a smartphone, a tablet PC, a notebook, or the like) possessed by a user.

In this case, the roles and functions of the components included in the intelligent flame detection apparatus according to the present invention are described, as follows.

When a flame is present within a corresponding monitoring area, the flame sensor 14 detects a flame first, and transmits a detection signal to the flame detection signal reception unit 21 of the control board 20.

The infrared thermographic camera 16 receives information about the detection of the flame from the flame detection signal reception unit 21, and starts to acquire a thermogram of the monitoring area.

In other words, when a flame detection signal detected by the flame sensor 14 is transmitted to the flame detection signal reception unit 21, the infrared thermographic camera starts to acquire an image of the monitoring area in response to a signal of the control board 20.

The image processing unit 22 of the control board 20 performs image processing adapted to determine whether the flame is a flame attributable to a real fire or a flame allowed in advance (an artificial flame) based on the image photographed by the infrared thermographic camera 16.

In this case, when, as a result of the image processing performed by the image processing unit 22, the flame is not an allowed flame, the value of infrared rays radiated from the flame is larger than an allowable infrared ray value, or the value of ultraviolet rays radiated from the flame is larger than an allowable ultraviolet ray value, the control board 20 performs control such that the infrared thermographic camera 16 starts photographing adapted to determine whether a human is present within the monitoring area.

The communication module 25 of the control board 20 is configured to communicate with a smart device (a smartphone, a tablet PC, a notebook, or the like) possessed by a user. Through this, the user may perform the control setting of the control board 20 by manipulating the smart device.

The fire determination unit 23 functions to compare the size (region) or the like of the flame with a reference value and to then generate a fire signal when the size (region) or the like of the flame is larger than the reference value. The alarm signal output unit 24 functions to output an alarm signal in response to a fire occurrence signal of the fire determination unit 23.

In this case, the flow of the operation of the intelligent flame detection apparatus using an infrared thermogram according to the present invention performed based on the above-described configuration is described, as follows.

Figure 7:
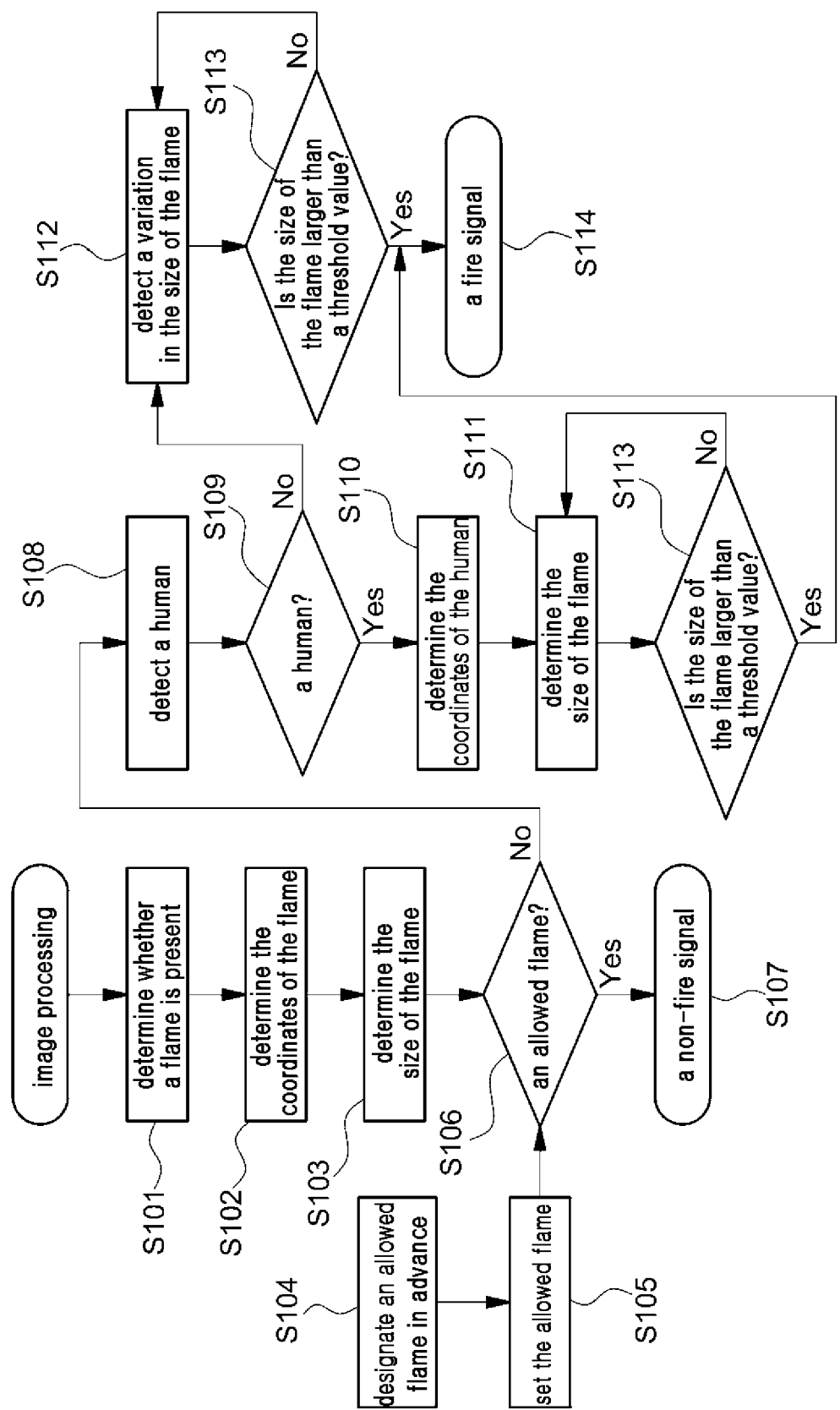
FIG. 7 is a flowchart showing an intelligent flame detection method using an infrared thermogram according to the present invention.

The accompanying FIG. 6 is a control configuration diagram of the intelligent flame detection apparatus using an infrared thermogram according to the present invention, and FIG. 7 is a flowchart showing an intelligent flame detection method using an infrared thermogram according to the present invention.

First, when a flame is present within a corresponding monitoring area, the flame sensor 14 detects the flame first, and transmits a detection signal to the flame detection signal reception unit 21 of the control board 20.

Thereafter, the infrared thermographic camera 16 starts to acquire a thermogram of the monitoring area in response to a signal of the control board 20, and the image processing unit 22 performs predetermined image processing based on the acquired thermogram.

In particular, whether a flame is present within a monitoring area is determined at step S101 as the first step of a image processing process performed by the image processing unit 22, the coordinates and size of the flame are determined when the flame is present at step S102, and whether the determined flame is an allowed flame is determined at step S103.

In this case, the allowed flame does not refer to a real flame attributable to a fire, but refers to an artificial flame allowed in advance (for example, a work flame at an industrial site, a halogen light flame, a gas lighter flame, a gas burner flame, a high-temperature equipment flame, a flame of one of surrounding various electric heaters, heat generating lights and heaters, or the like).

A user may register such an artificial flame in the memory or the like of the control board 20 as an allowed flame at any point in time before the above image processing in advance via a smart device (a smartphone, a tablet PC, a notebook, or the like).

In other words, when the user inputs an artificial flame by using a possessed smart device, the artificial flame input by the user via the communication module 25 is registered in the control board as a flame allowed in advance.

In greater detail, when the user inputs an artificial flame which may occur in a predetermined fire monitoring area via a smart device app at step S104, the artificial flame input to the memory or the like of the control board 20 by the user via the communication module 25 is registered as an allowed flame in advance at step S105.

Figure 8:
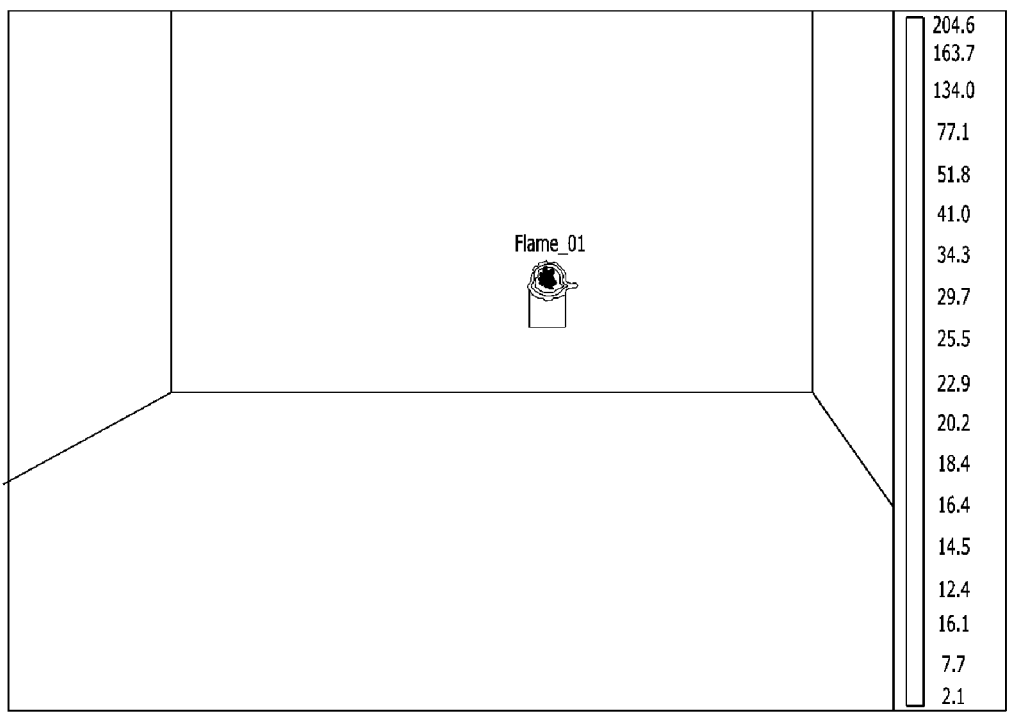
FIG. 8 is an image showing a charcoal flame thermogram screen as one example of an allowed flame.
Figure 9:
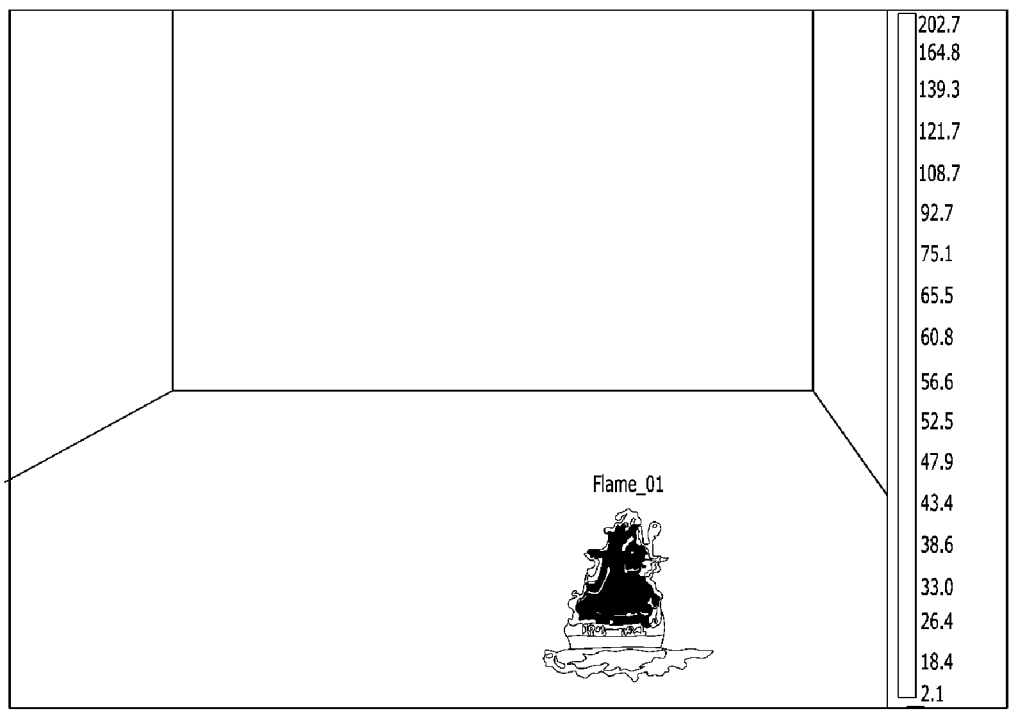
FIG. 9 is an image showing a gas burner thermogram screen as another example of an allowed flame.

Accordingly, when, as a result of image processing adapted to determine whether the flame in question is a flame attributable to a real fire or a flame allowed in advance (an artificial flame) performed by the image processing unit 22 based on an image photographed by the infrared thermographic camera 16 at step S106, the flame in question is determined to be an allowed flame, as shown in, for example, a charcoal flame thermogram screen shown in FIG. 8 or a gas burner thermogram screen shown in FIG. 9, the image processing unit 22 outputs a non-fire signal at step S107.

Simultaneously, the image processing unit 22 converts an infrared or ultraviolet ray value, currently input from the flame sensor 14, into the background value of a thermogram image. When an infrared or ultraviolet ray value input from the flame sensor 14 thereafter is equal to or larger than the obtained background value, the above-described image processing is re-performed additionally.

Meanwhile, when, as a result of the performance of step S106, the flame in question is not an allowed flame, a current infrared ray value is larger than an allowable infrared ray value, or a current ultraviolet ray value is larger than an allowable infrared ray value, the process proceeds to the step of determining whether a human is present in the monitoring area at step S108 rather than immediately performing the determination of whether a fire has occurred.

Accordingly, the infrared thermographic camera 16 starts photographing adapted to determine whether a human is present in the monitoring area at step S109.

Thereafter, when the image processing unit 22 has determined that a human is present in the monitoring area based on the thermogram photographing signal of the infrared thermographic camera 16 at step S110, the image processing unit 22 determines the coordinates of the human, determines adjacency between the human and the flame, and continuously monitor a variation in the size (region) or the like of the flame at step S111.

Figure 10:
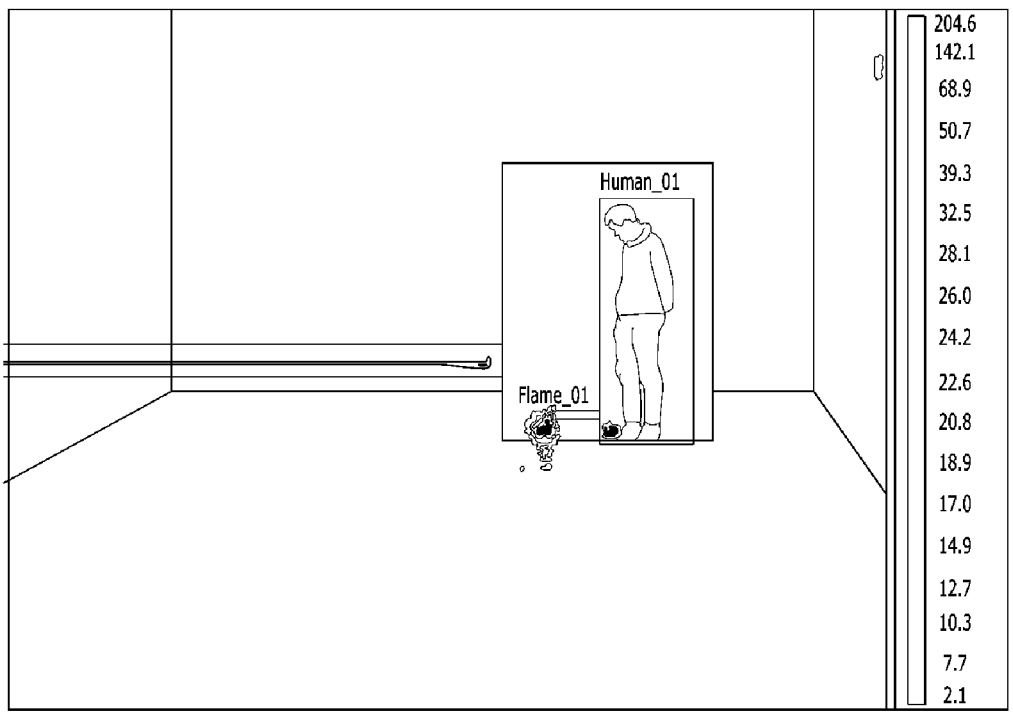
FIGS. 10 to 12 are thermogram images showing states in which a flame is not an allowed flame, a human is present near a flame, and the size of a flame does not exceed a reference value.
Figure 11:
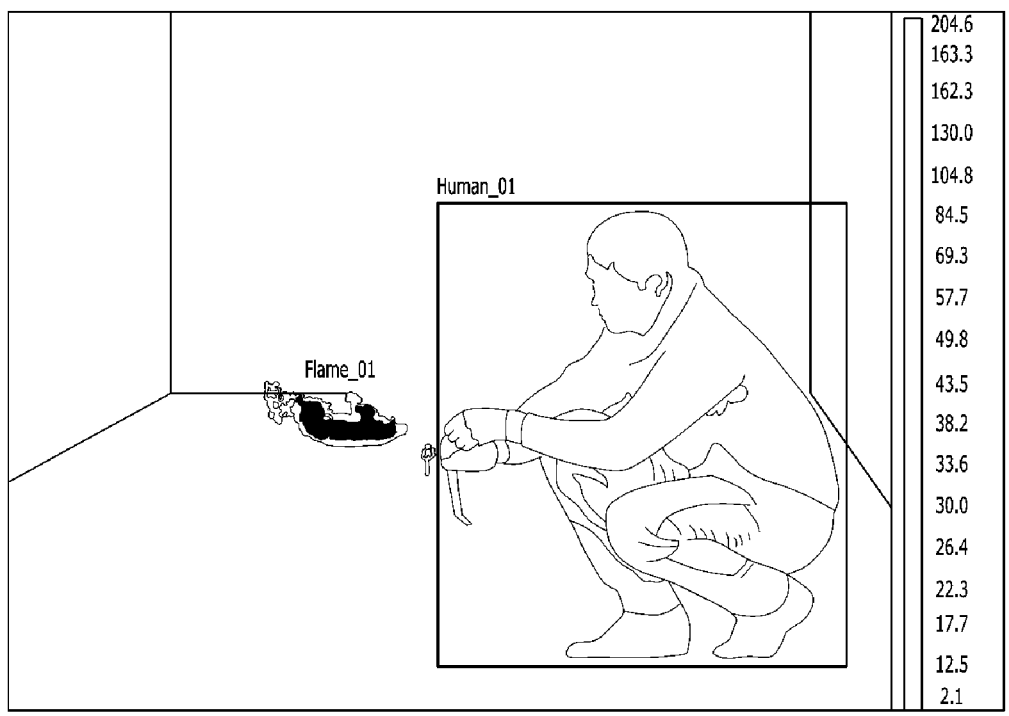
Figure 12:
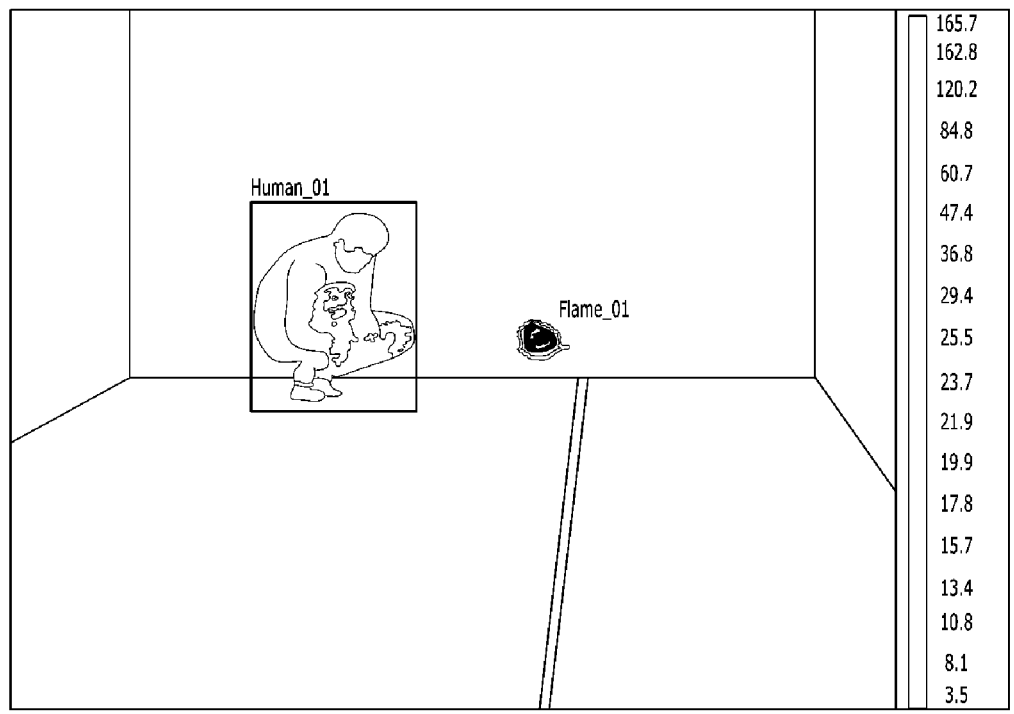

For example, as shown in the thermogram images of the accompanying FIGS. 10 to 12, continuous monitoring adapted to determinate that the flame in question is not an allowed flame but a work flame which is close to the human and the size of which does not increase is performed at step S111.

The reason why whether a human is present is determined even when the flame present within the monitoring area is not an allowed flame, as described above, is to determine the flame present within the monitoring area, i.e., to determine whether the flame in question is a work flame which is an artificial flame, a flame which is being appropriately used by a human, or a real fire flame which occurs in a situation where there is no human and also to determine whether a fire has occurred in a situation where there is a human (for example, due to arson).

Meanwhile, technology for detecting a human in a specific image is classified as significantly difficult technology in a related research field. Representative technologies use technologies using visible images. However, these technologies are disadvantageous in that it is impossible to detect humans assuming various poses or performing various acts because most of the technologies focus on pedestrian detection, in that a detection process is complex and takes a long time, and in that an erroneous detection rate is high due to the influence of a shadow, an adjacent color, an external environment (a light condition, and/or the like), and/or the like.

In contrast, in the present invention, the detection of a human can be accurately implemented using an infrared thermogram.

Figure 13:
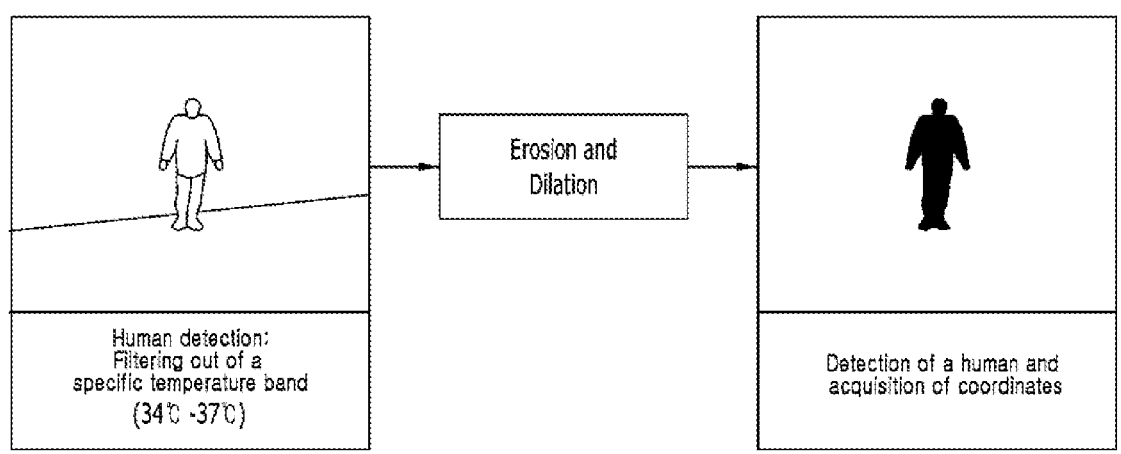
FIGS. 13 and 14 are thermogram images showing a human detection process using an infrared thermographic camera.

For example, at the above-described step S111, when the coordinates of a human are detected by the image processing unit 22, a human may be detected and the coordinates of the human may be acquired by filtering out a specific temperature band (ranging from 34 to 37° C.) within a thermogram photographed by the infrared thermographic camera 16, as shown in the accompanying FIG. 13.

Figure 14:
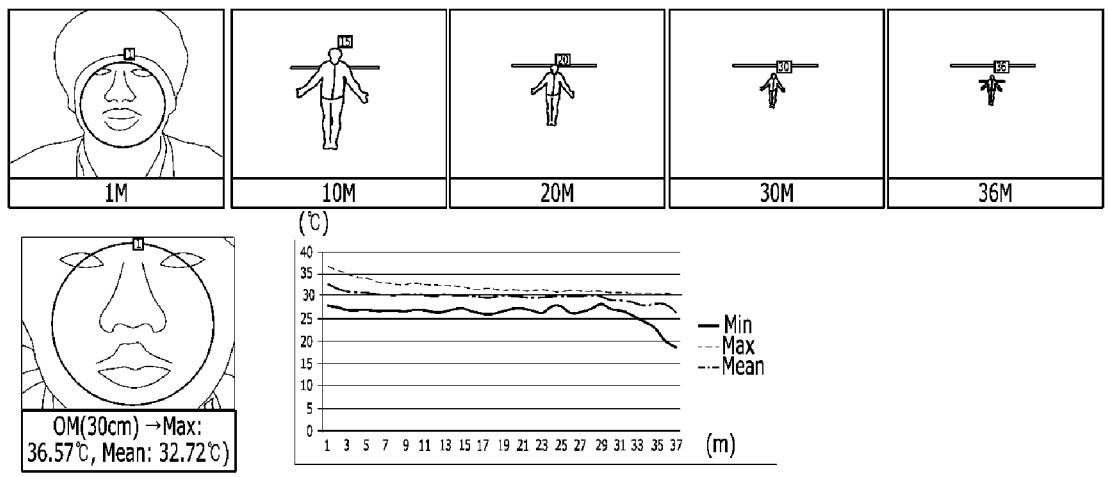

The temperature distribution characteristic of a human varies with a distance. Preferably, in the present invention, in order to calculate the reference temperature of the human detection technology using an infrared thermogram, distance-based temperatures are measured and analyzed, as shown in the accompanying FIG. 14. In a thermogram photographed by the infrared thermographic camera 16, in connection with human detection temperatures, a maximum value of 36.5° C. and an average value of 32.7° C. are selected as appropriate values based on a face region.

As described above, the human detection technology using an infrared thermogram according to the present invention detects a human by using a body temperature. Accordingly, the technology is not influenced by a shadow attributable to lighting or the like, the technology can easily detect a human in an external environment, such as dust, fog, smoke, or the like, the detection of a human in a wide monitoring area can be easily performed using even a low-resolution infrared thermographic camera because a minimum required resolution for the detection of a human is six pixels in a vertical direction and the processing of a photographed image can be rapidly performed, and a human detection process can be simply and rapidly performed because the technology performs background processing by using a temperature-based threshold value unlike the conventional technologies.

Meanwhile, regardless of whether a human is present within the monitoring area, the image processing unit 22 continues to monitor the size (region) of the flame at step S112, and the fire determination unit 23 continues to compare the size (region) of the flame with a reference value (a threshold value) at step S113.

When, as a result of the comparison, the size (region) of the flame is larger than the reference value even when a human is present within the monitoring area or the size (region) of the flame is larger than the reference value in a state where a human is not present within the monitoring area, a fire signal is generated at step S114.

In other words, in response to the fire occurrence signal output from the fire determination unit 23, the alarm signal output unit 24 outputs an alarm signal.

Figure 15:
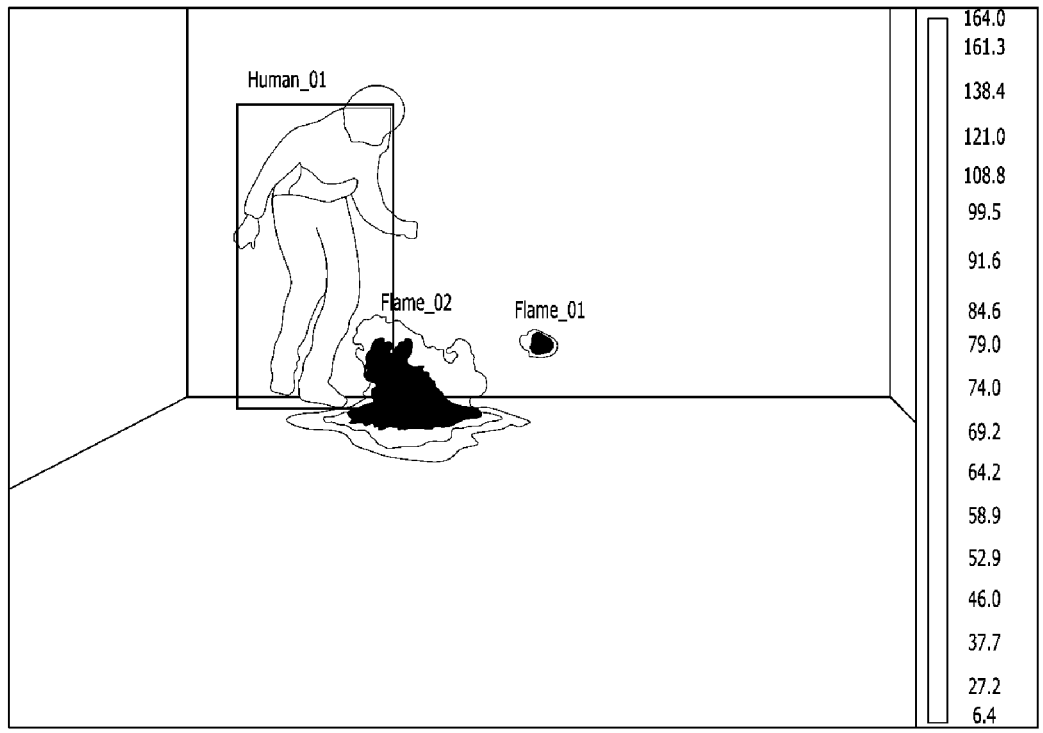
FIG. 15 is a thermogram image showing a state in which a flame has spread to a floor due to the carelessness of an operator.
Figure 16:
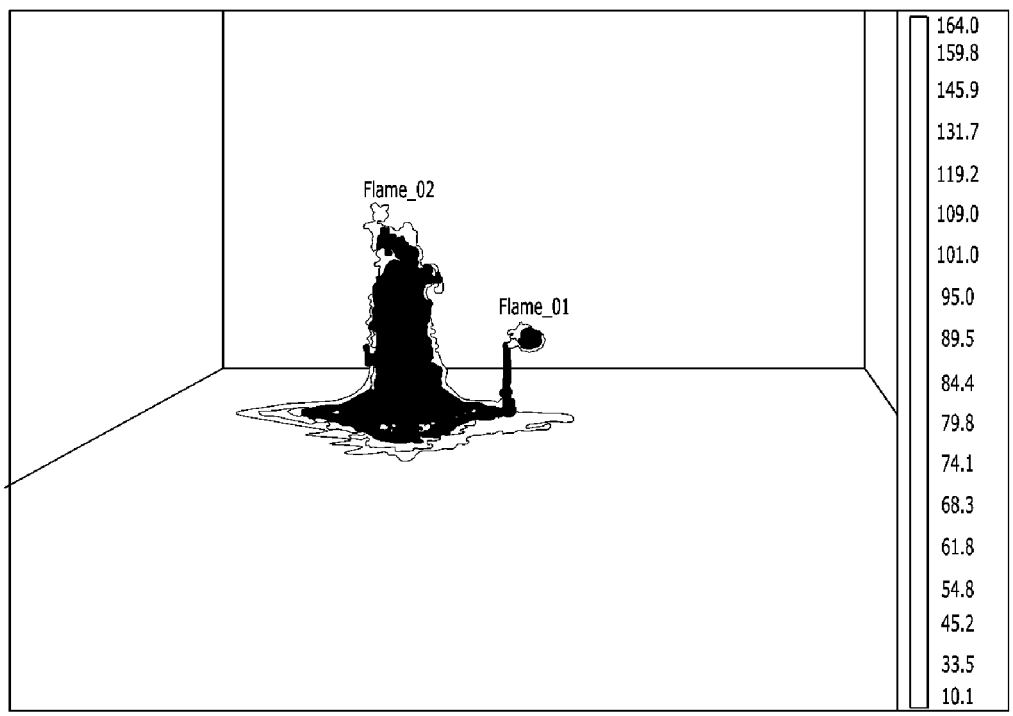
FIG. 16 is a thermogram image showing a situation in which a flame has wide spread and an operator has left a site.

For example, when the flame has spread to a floor due to the carelessness of an operator, as shown in the thermogram image of the accompanying FIG. 15, or when the flame has wide spread and an operator has left a site, as shown in the thermogram image of FIG. 16, the fire determination unit 23 determines that a new flame other than a work flame has occurred and the size (region) of the flame has becomes larger than a reference value, and the alarm signal output unit 24 outputs a fire alarm signal.

In this case, referring to an example of the relationships between the detection values of the flame sensor and infrared thermogram image processing, Flame_01 indicates an allowable flame set in advance by a user in the accompanying FIGS. 15 and 16. When only this allowed flame Flame_01 is present within the monitoring area, the infrared or ultraviolet ray value (size) of the flame detected by the flame sensor 14 becomes a background value, and a state in question is determined to be a general non-fire state.

In contrast, referring to another example of the relationships between the detection values of the flame sensor and infrared thermogram image processing, Flame_02 indicates a new flame in the accompanying FIGS. 15 and 16. As this new flame Flame_02 is generated, the flame sensor detects an infrared or ultraviolet ray value larger than a background value and provides notification that the flame has been detected, the flame is determined to be a flame other than an allowed flame in an infrared thermogram and the size (region) of the flame is observed, and the alarm signal output unit 24 outputs a fire alarm signal when, as a result of the observation, it is determined that the size (region) of the flame has become larger than the reference value.

Figure 17:
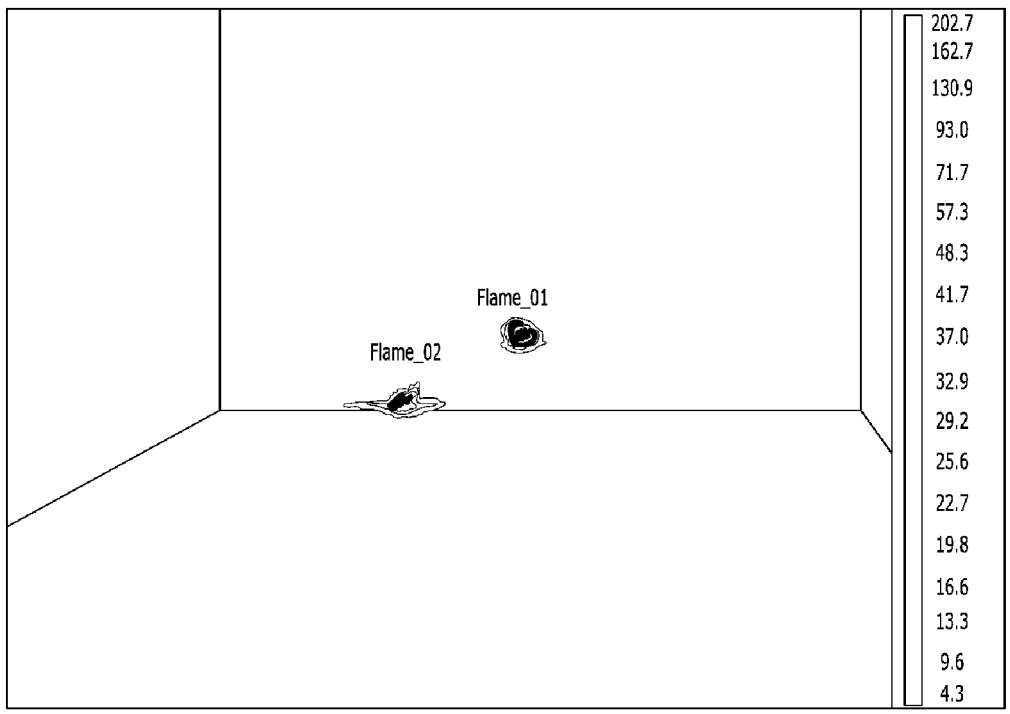
FIGS. 17 to 19 are thermogram images showing a process in which a new flame, other than an allowed flame, is generated within a monitoring area and the size (region) of the flame gradually becomes larger than a reference value.
Figure 18:
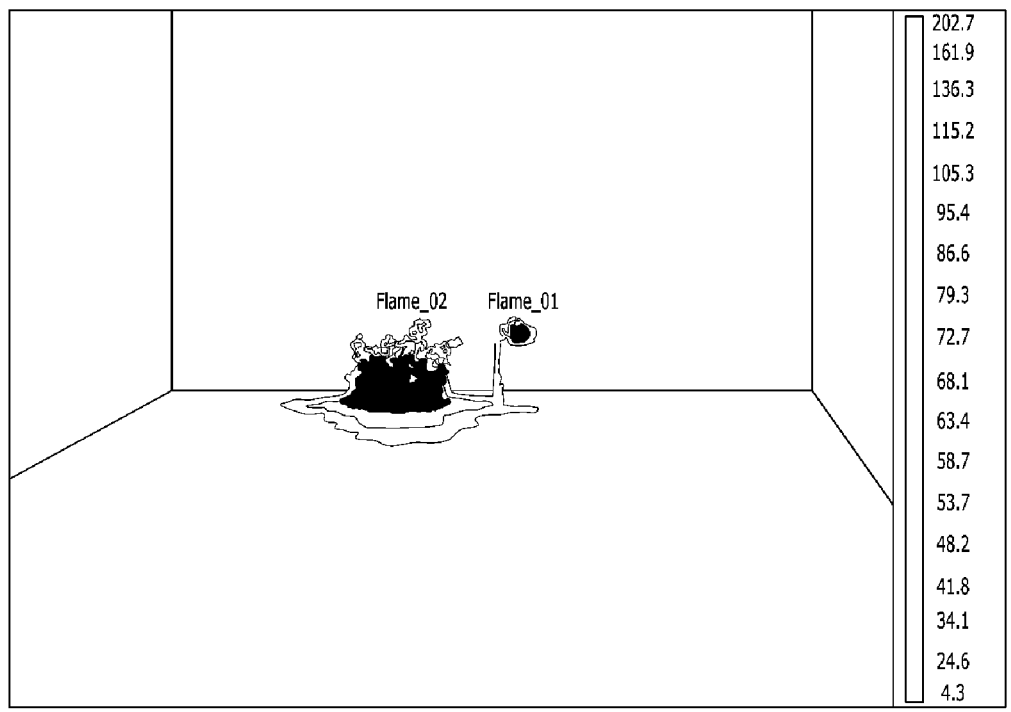
Figure 19:
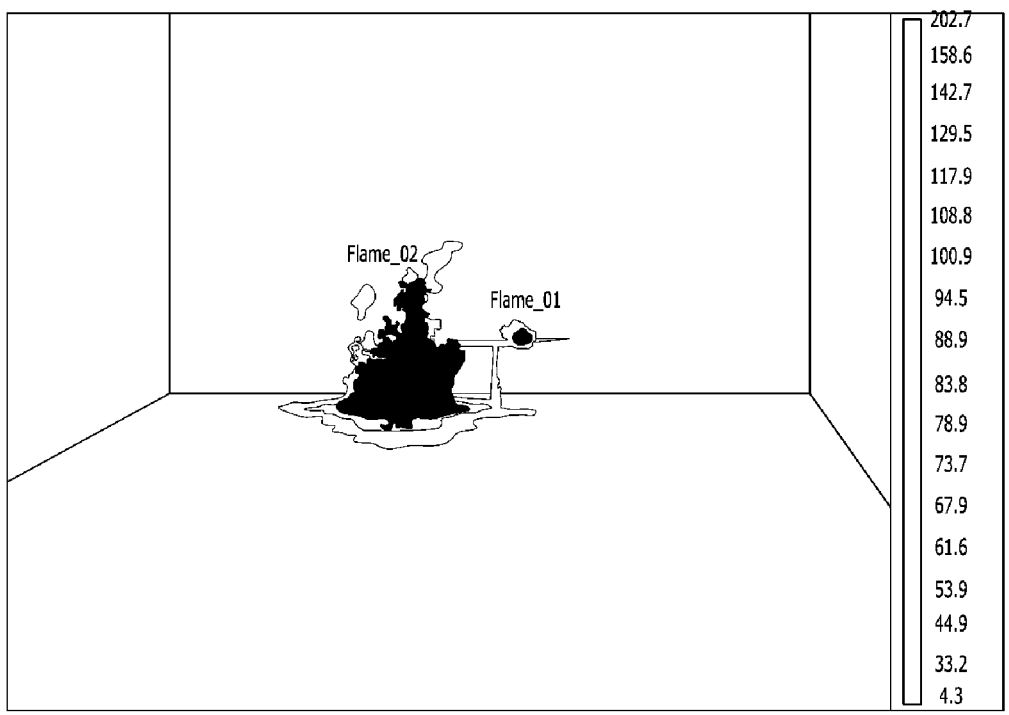

For example, sequentially referring to the accompanying FIGS. 17 to 19, in an infrared thermogram, it is determined that new flame Flame_02 other than allowed flame Flame_01 has been generated, the size (region) of the flame has gradually increased, and the size (region) of the flame has become larger than the reference value, the alarm signal output unit 24 outputs a fire alarm signal.

As described above, according to the present invention, an artificial flame present within a fire monitoring area is detected as an allowed flame unrelated to a fire alarm situation, and thus it can be accurately detected whether a currently detected flame is a flame related to the occurrence of a fire or an artificial flame, thereby significantly reducing unwanted alarms and improving the accuracy of fire alarms.

DESCRIPTION OF REFERENCE SYMBOLS

10: intelligent flame detection apparatus
12: housing
14: flame sensor
16: infrared thermographic camera 20: control board
21: flame detection signal reception unit
22: image processing unit
23: fire determination unit
24: alarm signal output unit
25: communication module

The invention claimed is:

1. An intelligent flame detection apparatus using an infrared thermogram, the apparatus comprising:
a housing;
a flame sensor mounted on the housing, and configured to detect a flame within a monitoring area;
an infrared thermographic camera mounted on the housing, and configured to acquire a thermogram of the monitoring area; and
a control board adapted and configured to perform image processing to determine whether the flame within the monitoring area is a flame attributable to a real fire or an artificial flame allowed in advance through image processing of the thermogram photographed by the infrared thermographic camera and processing of sensing data acquired by the flame sensor,
wherein the control board includes: a flame detection signal reception unit adapted and configured to receive a flame detection signal of the flame sensor; an image processing unit adapted and configured to perform image processing to determine whether the flame within the monitoring area is a flame attributable to a real fire or an artificial flame allowed in advance based on the thermogram of the flame photographed by the infrared thermographic camera; a fire determination unit configured to determine whether a fire signal has been generated by comparing a size of the flame with a reference value; an alarm signal output unit configured to output a fire alarm signal in response to a fire occurrence signal output from the fire determination; and a communication module configured to perform communication with a smart device possessed by a user,
wherein the control board is adapted and configured to perform control such that the infrared thermographic camera performs photographing to determine whether a human is present within the monitoring area when, as a result of the image processing, the flame is not an allowed flame, a value of infrared rays radiated from the flame is larger than an allowable infrared ray value, or a value of ultraviolet rays radiated from the flame is larger than an allowable ultraviolet ray value,
wherein when it is determined that a human is present within the monitoring area, determining, by the image processing unit, coordinates of the human, determining, by the image processing unit, adjacency between the human and the flame, and continuously monitoring the flame, by the image processing unit, and wherein it is determined that a fire has occurred,
(a) when a human exists in the monitoring area and the size of the flame is larger than a reference value, or
(b) the size of the flame is larger than the reference value when the absence of a human in the monitoring area.

2. The intelligent flame detection apparatus of claim 1, wherein a flame detector using ultraviolet or infrared rays or a three-wave flame detector is adapted as the flame sensor.

3. The intelligent flame detection apparatus of claim 1, wherein when the user inputs an artificial flame by using a possessed smart device, the artificial flame input by the user is registered in the control board as a flame allowed in advance via the communication module.

4. An intelligent flame detection method using an infrared thermogram, the method comprising:
i) detecting, by a flame sensor, a flame present in a corresponding monitoring area;
ii) acquiring, by an infrared thermographic camera, a thermogram of the monitoring area;
iii) performing, by an image processing unit of a control board, image processing adapted to determine whether the flame within the monitoring area is a flame attributable to a real fire or an artificial flame allowed in advance based on the acquired thermogram;
iv) determining, by a fire determination unit, whether a fire signal has been generated by comparing a size of the flame based on the image processing with a reference value; and
v) outputting, by an alarm signal output unit, a fire alarm signal in response to a fire occurrence signal output from the fire determination unit,
before performing the image processing, registering the artificial flame, input by the user, in the control board as a flame allowed in advance via a communication module by inputting the artificial flame by using the smart device possessed by the user,
wherein performing the image processing at step iii) comprises:
determining whether a flame is present within the monitoring area;
when the flame is present within the monitoring area, determining coordinates and size of the flame, and then determining whether the determined flame is a flame attributable to a real fire or an artificial flame allowed in advance; and
when the determined flame is an allowed flame, outputting a non-fire signal, wherein a result of performing the image processing, when it is determined that it is not an allowed flame, or when the infrared ray value is greater than the allowed infrared ray value, or when the current ultraviolet ray value is greater than the allowed ultraviolet ray value, an image capture via infrared thermographic camera is performed.

5. The intelligent flame detection method of claim 4, wherein an infrared or ultraviolet ray value input from the current flame sensor is converted into a background value along with outputting the non-fire signal, and then the image processing is re-performed again when the infrared or ultraviolet ray value input from the flame sensor is equal to or larger than the resulting background value.

6. The intelligent flame detection method of claim 4, wherein when, as a result of the image processing, it is determined that the flame is not an allowed flame, a currently infrared ray value is larger than an allowable infrared ray value, or a current ultraviolet ray value is larger than an allowable infrared ray value, determining whether a human is present within the monitoring area by using the infrared thermographic camera is performed.

7. The intelligent flame detection method of claim 4, wherein determining whether a human is present within the monitoring area is performed by detecting the human and acquiring coordinates of the human by filtering out a specific temperature band within the thermogram photographed by the infrared thermographic camera.

8. The intelligent flame detection method of claim 4, wherein when it is determined that a human is present within the monitoring area, determining, by the image processing unit, coordinates of the human, determining, by the image processing unit, adjacency between the human and the flame, and continuously monitoring, by the image processing unit, a variation in the size of the flame are performed, and a fire determination unit outputs a fire signal for a fire alarm when the size of the flame is larger than a reference value.

9. The intelligent flame detection method of claim 4, wherein regardless of whether a human is present within the monitoring area, when, as a result of the image processing, it is determined that the size of the flame is larger than a reference value by comparing the size of the flame within the monitoring area with a reference value, a fire determination unit outputs a fire signal for a fire alarm.

* * * * *